United States Patent
Yamaguchi et al.

(10) Patent No.: US 7,807,014 B2
(45) Date of Patent: Oct. 5, 2010

(54) THERMOSETTING SOLUTION COMPOSITION AND PREPREG

(75) Inventors: Hiroaki Yamaguchi, Yamaguchi (JP); Fumio Aoki, Chiba (JP)

(73) Assignee: UBI Industries, Ltd., Ubi-shi, Yamaguchi (JP)

( * ) Notice: Subject to any disclaimer, the term of this patent is extended or adjusted under 35 U.S.C. 154(b) by 0 days.

(21) Appl. No.: 12/178,855

(22) Filed: Jul. 24, 2008

(65) Prior Publication Data

US 2009/0036601 A1    Feb. 5, 2009

Related U.S. Application Data

(63) Continuation of application No. 11/443,000, filed on May 31, 2006, now abandoned.

(30) Foreign Application Priority Data

| May 31, 2005 | (JP) | ............................. 2005-160585 |
| Dec. 1, 2005 | (JP) | ............................. 2005-348407 |
| Apr. 19, 2006 | (JP) | ............................. 2006-116076 |

(51) Int. Cl.
- C04B 37/00 (2006.01)
- B29C 65/00 (2006.01)
- B32B 37/00 (2006.01)
- C08J 5/00 (2006.01)
- C08L 77/00 (2006.01)
- D21H 17/55 (2006.01)
- C08G 69/26 (2006.01)

(52) U.S. Cl. ....................... 156/325; 524/607; 528/353; 156/307.1

(58) Field of Classification Search .............. 156/307.1, 156/325; 524/607; 528/353
See application file for complete search history.

(56) References Cited

U.S. PATENT DOCUMENTS 4,061,856 A    12/1977    Hsu (Continued)

FOREIGN PATENT DOCUMENTS

EP    0 688 809 A1    12/1995

(Continued)

OTHER PUBLICATIONS

European Search Report; Application No. EP 06 01 1232 dated Aug. 18, 2006.

*Primary Examiner*—Philip C Tucker
*Assistant Examiner*—Michael N Orlando
(74) *Attorney, Agent, or Firm*—Nixon Peabody LLP; Jeffrey L. Costellia (57) ABSTRACT

A thermosetting solution composition composed of a biphenyltetracarboxylic acid compound containing a partial lower aliphatic alkyl ester of 2,3,3',4'-biphenyltetracarboxylic acid and/or a partial lower aliphatic alkyl ester of 2,2',3,3'-biphenyltetracarboxylic acid, an aromatic diamine compound in a molar amount larger than a molar amount of the biphenyltetracarboxylic acid compound, a partial lower aliphatic alkyl ester of 4-(2-phenylethynyl)phthalic acid compound in a molar amount as much as 1.8-2.2 times a molar amount corresponding to a difference between the molar amount of the aromatic diamine compound and the molar amount of the biphenyltetracarboxylic acid compound, and an organic solvent composed of a lower aliphatic alcohol is of value for manufacture of a prepreg.

9 Claims, 6 Drawing Sheets

U.S. PATENT DOCUMENTS

| | | | |
|---|---|---|---|
| 4,973,661 A | 11/1990 | Lee et al. | |
| 5,461,138 A | 10/1995 | Serafini et al. | |
| 5,508,357 A | 4/1996 | Matsuura et al. | |
| 5,614,606 A | 3/1997 | Chaudhari et al. | |
| 6,103,864 A | 8/2000 | Alston et al. | |
| 6,184,333 B1* | 2/2001 | Gray | 528/170 |
| 6,281,323 B1* | 8/2001 | Yokota et al. | 528/170 |
| 6,916,898 B2 | 7/2005 | Kuroki et al. | |
| 2004/0054096 A1* | 3/2004 | Hosaka et al. | 525/420 |
| 2005/0014925 A1 | 1/2005 | Yokota et al. | |

FOREIGN PATENT DOCUMENTS

| | | |
|---|---|---|
| EP | 0 792 903 A1 | 9/1997 |
| GB | 1 298 567 | 12/1972 |
| JP | 2000-219741 | 8/2000 |
| JP | 2002-511902 | 4/2002 |
| JP | 2004-331801 | 11/2004 |
| WO | WO 99/62989 | 12/1999 |

\* cited by examiner

THERMOSETTING SOLUTION COMPOSITION AND PREPREG

RELATED APPLICATIONS

The present application is a continuation of U.S. patent application Ser. No. 11/443,000 filed May 31, 2006, now abandoned.

FIELD OF THE INVENTION

The present invention relates to a thermosetting solution composition, a prepreg utilizing the same, and a method for manufacturing an aromatic polyimide resin article from the prepreg. In particular, the invention relates to a thermosetting solution composition favorably employable for manufacturing a prepreg and further an aromatic polyimide resin article.

BACKGROUND OF THE INVENTION

It is known that an aromatic polyimide resin article shows very favorable physical and chemical characteristics such as high mechanical strength, high heat resistance, and high resistance to chemical compounds. Accordingly, the aromatic polyimide resin has been widely employed for manufacturing substrate plates of electronic devices. The favorable physical and chemical characteristics of the aromatic polyimide resin have recently received increased attention, and hence the aromatic polyimide resin has been studied for the use in manufacturing various constitutional units of aeroplane and spacecraft. In fact, some aromatic polyimide resin articles are employed in these technical fields.

An aromatic polyimide article such as an aromatic polyimide sheet is generally manufactured by first preparing a solution of a polyamic acid (i.e., polyamide acid) by the reaction between an aromatic tetracarboxylic acid derivative and an aromatic diamine in a solvent, spreading the polyamic acid solution on a temporary support to prepare a polyamic acid sheet, and finally heating the polyamic acid sheet to give the polyimide sheet upon drying and cyclization reaction.

An aromatic polyimide article having a large thickness or an aromatic polyimide article of non-sheet form is generally manufactured utilizing a plurality of prepregs. A plurality of the prepregs are laminated one on another and then heated under pressure to give an aromatic polyimide article. The prepreg is prepared by impregnating a sheet matrix of a reinforcing fiber with a thermosetting polymer solution composition.

Japanese PCT publication 2002-511902 discloses a method of preparing a prepreg from a polyimide precursor solution which has a solid concentration of 50 to 80 wt. %, a volatile concentration of not higher than 35 wt. %, and a Brookfield viscosity of 4,000 to 10,000 cP. The typical polyimide precursor solution is prepared from oxydiphthalic dianhydride, phthalic acid and 3,4'-oxydianiline. The solvent of the solution typically is a mixture of N-methyl-2-pyrrolidone and ethanol.

Japanese Provisional Patent Publication 2000-219741 A describes a terminal modified imide oligomer solution (thermosetting solution composition) which is obtained by the reaction of 2,3,3',4'-biphenyltetracarboxylic acid with an aromatic diamine compound and 4-(2-phenylethynyl)phthalic anhydride and further describes that the solution composition is employable for manufacturing a prepreg and further an aromatic polyimide article (i.e., cured article). The publication describes a list of solvents employable for the preparation of the solution composition which includes N-methyl-2-pyrrolidone, N,N-dimethylformamide, N,N-dimethylacetamide, N,N-diethylacetamide, and N-caprolactam.

Japanese Provisional Patent Publication 2004-331801 A describes that 2,2',3,3'-biphenyltetracarboxylic dianhydride is employable for the preparation of an aromatic polyimide as the aromatic tetracarboxylic acid compound, and further describes that the dianhydride is reacted with an aromatic diamine compound in the presence of a reactive crosslinking agent to give a polyamic acid oligomer.

The thermosetting solution composition comprising the terminal modified imide oligomer solution prepared by the reaction of 2,3,3',4'-biphenyltetracarboxylic acid with an aromatic diamine compound and 4-(2-phenylethynyl)phthalic anhydride in a solvent is of value for preparing an aromatic polyimide article (i.e., cured article) having excellent physical and chemical properties. However, all solvents described in the publication as the solvents employable for the preparation of the imide, that is, N-methyl-2-pyrrolidone, N,N-dimethylformamide, N,N-dimethylacetamide, N,N-diethylacetamide, and N-caprolactam, have a high boiling point. Therefore, removal of the solvent from the solution composition by evaporation requires high temperatures and long periods of time. These evaporation conditions are not favorable from the viewpoint of industrial preparation.

SUMMARY OF THE INVENTION

Accordingly, it is an object of the present invention to provide a thermosetting solution composition which is easily removed by distillation in the process of preparation of a prepreg for the use of manufacture of an aromatic polyimide article (i.e., cured article) and further in the process of the manufacture of the cured article and further which is easily handled in the industrial process.

It is another object of the invention to provide a prepreg which is favorably employable for manufacture of an aromatic polyimide article (i.e., cured article) by way of heating under pressure from the viewpoints that the solvent used as well as water and alcohol which are by-produced in these processes are easily removed by evaporation.

The inventors of the present invention have noted and studied the thermosetting solution composition described in Japanese Provisional Patent Publication 2000-219741 A. As a result of the studies, they have discovered that when 2,3,3',4'-biphenyltetracarboxylic dianhydride and 4-(2-phenylethynyl)phthalic anhydride are dissolved in a lower aliphatic alcohol such as methanol or ethanol and heated, a partial lower aliphatic alkyl ester of 2,3,3',4'-biphenyltetracarboxylic acid and a partial lower aliphatic alkyl ester of 4-(2-phenylethynyl)phthalic acid both of which are soluble in the employed alcohol are produced, and that a solution composition comprising the resulting solution and an aromatic diamine compound shows a stable solution viscosity. The inventors have further discovered that the resulting solution composition is favorably employable for preparing a prepreg and furthermore that the prepreg is easily converted into a cured polyimide article. The lower aliphatic alcohol employed as a solvent of the thermosetting solution composition is advantageous in that its boiling point is low, that it is easily removed by evaporation, that it is easily handled, and that the cost is low. Accordingly, the use of the lower aliphatic alcohol as the solvent of the thermosetting solution composition is very advantageous particularly from the viewpoint of the industrial preparation of the thermosetting solution composition and the prepreg.

The present invention resides in a thermosetting solution composition comprising a biphenyltetracarboxylic acid compound containing at least 15 mol % of a partial lower aliphatic alkyl ester of 2,3,3',4'-biphenyltetracarboxylic acid and/or a partial lower aliphatic alkyl ester of 2,2',3,3'-biphenyltetracarboxylic acid, an aromatic diamine compound in a molar amount larger than a molar amount of the biphenyltetracarboxylic acid compound, a partial lower aliphatic alkyl ester of 4-(2-phenylethynyl)phthalic acid compound in a molar amount as much as 1.8-2.2 times a molar amount corresponding to a difference between the molar amount of the aromatic diamine compound and the molar amount of the biphenyltetracarboxylic acid compound, and an organic solvent comprising a lower aliphatic alcohol.

The lower aliphatic alcohol employed in the invention includes a monovalent aliphatic alcohol having 1 to 6 carbon atoms. The representative examples of the lower aliphatic alcohols include methanol and ethanol. The lower aliphatic alkyl ester include an ester with a monovalent aliphatic alkyl alcohol having 1 to 6 carbon atoms. The representative examples include methyl ester and ethyl ester. The partial lower aliphatic alkyl ester means that one to three carboxyl groups (generally two carboxyl groups) of the biphenyltetracarboxylic acid form ester bondings with the lower aliphatic alcohol, and that one carboxyl group of 4-(2-phenylethynyl) phthalic acid forms an ester bonding with the lower aliphatic alcohol.

The present invention further resides in a thermosetting solution composition comprising a biphenyltetracarboxylic acid compound containing at least 15 mol % of a partial methyl ester of 2,3,3',4'-biphenyltetracarboxylic acid and/or a partial methyl ester of 2,2',3,3'-biphenyltetracarboxylic acid, an aromatic diamine compound in a molar amount larger than a molar amount of the biphenyltetracarboxylic acid compound, a partial methyl ester of 4-(2-phenylethynyl)phthalic acid compound in a molar amount as much as 1.8-2.2 times a molar amount corresponding to a difference between the molar amount of the aromatic diamine compound and the molar amount of the biphenyltetracarboxylic acid compound, and an organic solvent comprising ethanol.

The preferred embodiments of the thermosetting solution compositions of the invention are set forth below.

(1) The lower aliphatic alcohol is methanol, ethanol, or a mixture of these alcohols.

(2) The lower aliphatic alkyl ester is methyl ester, ethyl ester, or a mixture of methyl ester and ethyl ester.

(3) The molar amount of the partial lower aliphatic alkyl ester of 4-(2-phenylethynyl)phthalic acid compound is as much as 1.95-2.05 times a molar amount corresponding to the difference the molar amount of the aromatic diamine compound and the molar amount of the biphenyltetracarboxylic acid compound.

(4) A total amount of the biphenyltetracarboxylic acid compound, the aromatic diamine compound, and 2-(2-phenylethynyl)phthalic acid compound is in the range of 30 to 80 wt. %, per the amount of the solution composition.

(5) The biphenyltetracarboxylic acid compound comprises at least 50 molar % of 2,3,3',4'-biphenyltetracarboxylic acid compound comprising a partial lower aliphatic alkyl ester of 2,3,3',4'-biphenyltetracarboxylic acid compound.

(6) The aromatic diamine compound comprises at least 50 molar % of an aromatic diamine having one aromatic ring in a molecular structure thereof.

(7) The aromatic diamine compound comprises p-phenylenediamine, 1,3-bis(4-aminophenoxy)benzene, or a mixture thereof.

(8) An imidazole compound is contained.

The present invention furthermore resides in a thermosetting powder composition comprising a biphenyltetracarboxylic acid compound containing at least 15 mol % of a partial lower aliphatic alkyl ester of 2,3,3',4'-biphenyltetracarboxylic acid and/or a partial lower aliphatic alkyl ester of 2,2',3, 3'-biphenyltetracarboxylic acid, an aromatic diamine compound in a molar amount larger than a molar amount of the biphenyltetracarboxylic acid compound, and a partial lower aliphatic alkyl ester of 4-(2-phenylethynyl)phthalic acid compound in a molar amount as much as 1.8-2.2 times a molar amount corresponding to a difference between the molar amount of the aromatic diamine compound and the molar amount of the biphenyltetracarboxylic acid compound.

In the above-mentioned thermosetting powder composition, the partial lower alkyl ester preferably is a partial methyl ester.

The present invention furthermore resides in a prepreg comprising a sheet matrix of a reinforcing fiber impregnated with the thermosetting solution composition of the invention.

The present invention furthermore resides in a method of manufacturing a resin article which comprises laminating a plural number of the prepregs of the invention one on another and heating the resulting laminate under pressure.

The thermosetting solution composition of the invention shows a high solution stability regardless of using an easily volatile solvent. Therefore, the solvent is easily removed by evaporation and easily handled when a prepreg is prepared using the solution composition. In other words, since the lower aliphatic alcohol employed as the solvent has a low boiling point, removal of the solvent as well as the by-produced water and compounds are easily removed by distillation in the procedures of the prepreg and the cured polyimide article.

Particularly, when the acid components of the thermosetting solution composition are in the form of methyl esters, the resulting prepreg easily gives a cured polyimide article having a desired form because the prepreg prepared using the thermosetting solution composition comprising the methyl esters is hardly deformed in its preparing procedure and shows good moldability.

In addition, when the solvent of the thermosetting solution composition is ethanol, the environmental atmosphere formed in the process of preparing the prepreg and further in the process of the cured polyimide article less worsen, as compared with the use of methanol as the solvent. Accordingly, it is most preferred that the acid components of the thermosetting solution composition are in the form of methyl esters and further that the solvent is ethanol.

DETAILED DESCRIPTION OF THE INVENTION

The monomer compounds required for the preparation of the thermosetting solution composition of the invention are descried below:

(1) a biphenyltetracarboxylic acid compound containing at least 15 mol % of a partial lower aliphatic alkyl ester of 2,3,3',4'-biphenyltetracarboxylic acid and/or a partial lower aliphatic alkyl ester of 2,2',3,3'-biphenyltetracarboxylic acid;

(2) an aromatic diamine compound in a molar amount larger than a molar amount of the biphenyltetracarboxylic acid compound; and (3) a partial lower aliphatic alkyl ester of 4-(2-phenylethynyl)phthalic acid compound (a portion less than 50 molar % may be not in the form of the alkyl ester) in a molar amount as much as 1.8-2.2 times a molar amount corresponding to a difference between the molar amount of the aromatic diamine compound and the molar amount of the biphenyltetracarboxylic acid compound.

The biphenyltetracarboxylic acid compound contains at least 15 molar % (preferably, at least 30 molar %, more preferably, at least 50 molar %, most preferably at least 80 molar %) of a partial aliphatic alkyl ester of 2,3,3',4'-biphenyltetracarboxylic acid and/or a partial aliphatic alkyl ester of 2,2',3,3'-biphenyltetracarboxylic acid. More preferably, the biphenyltetracarboxylic acid compound comprises a partial aliphatic alkyl ester of 2,3,3',4'-biphenyltetracarboxylic acid.

The partial aliphatic alkyl ester of 2,3,3',4'-biphenyltetracarboxylic acid can be prepared by placing 2,3,3',4'-biphenyltetracarboxylic dianhydride in a lower aliphatic alcohol and heating the resulting mixture to give a solution. The heating is preferably carried out at a temperature from 40° C. to the boiling temperature of the alcohol, under refluxing. The 2,3,3',4'-biphenyltetracarboxylic dianhydride is known as the starting compound for the preparation of an aromatic polyimide resin. The partial aliphatic alkyl ester of 2,2',3,3'-biphenyltetracarboxylic acid can be prepared by placing 2,2',3,3'-biphenyltetracarboxylic dianhydride in a lower aliphatic alcohol and heating the resulting mixture to give a solution. The 2,2',3,3'-biphenyltetracarboxylic dianhydride is described in detail in the aforementioned Japanese Provisional Patent Publication 2004-331801 A.

In the thermosetting solution composition, a portion (not more than 10 molar %) of the partial lower aliphatic alkyl ester of 2,3,3',4'-biphenyltetracarboxylic acid and/or a portion (not more than 10 molar %) of the partial lower aliphatic alkyl ester of 2,2',3,3'-biphenyltetracarboxylic acid can be replaced with a partial lower aliphatic alkyl ester of other tetracarboxylic acid. Examples of the partial lower aliphatic alkyl esters of other tetracarboxylic acids include a partial lower aliphatic alkyl ester of 3,3',4,4'-biphenyltetracarboxylic acid compound, a partial lower aliphatic alkyl ester of 3,3',4,4'-benzophenonetracarboxylic acid compound, a partial lower aliphatic alkyl ester of pyromellitic acid compound, and a partial lower aliphatic alkyl ester of bis(3,4-dicarboxydiphenyl)ether.

Examples of the aromatic diamine compounds include p-phenylene diamine, m-phenylene diamine, 1,3-bis(4-aminophenoxy)benzene, and their mixtures. Also employable are aromatic diamine compounds that are known to be utilized for the preparation of aromatic polyimide resins. These aromatic diamine compounds are described in detail in the aforementioned Japanese Provisional Patent Publication 2000-219741 A. Most preferred aromatic diamine compounds are p-phenylene diamine and a mixture of p-phenylene diamine and 1,3-bis(4-aminophenoxy)benzene, which are advantageous in preparing a thermosetting solution composition film of good form stability.

The aromatic diamine compounds are employed in a molar amount larger than a molar amount of the biphenyltetracarboxylic acid compound. For instance, the aromatic diamine compound is employed 1.1 to 2.0 mols, preferably 1.15 to 1.30 mols, per one mole of the biphenyltetracarboxylic acid compound.

When a mixture of p-phenylene diamine and 1,3-bis(4-aminophenoxy)benzene is used as the aromatic diamine compound, the mixture is preferably used in an amount of 1.15 to 1.30 mols per one mole of the biphenyltetracarboxylic acid compound, and p-phenylene diamine is preferably used in an amount of 50 to 70 molar % per the total amount of the p-phenylene diamine and 1,3-bis(4-aminophenoxy)benzene, so that the resulting cured polyimide article can have enough heat resistance and good molding characteristics.

The thermosetting solution composition of the invention further comprises a partial lower aliphatic alkyl ester of 4-(2-phenylethynyl)phthalic acid in a molar amount as much as 1.8-2.2 times, preferably as much as 1.95-2.05 times, a molar amount corresponding to a difference between the molar amount of the aromatic diamine compound and the molar amount of the biphenyltetracarboxylic acid compound.

The thermosetting solution composition of the invention further comprises an organic solvent comprising a lower aliphatic alcohol (monovalent aliphatic alcohol having 1 to 6 carbon atoms) as a main component. Preferred are methanol and ethanol. A mixture of lower aliphatic alcohols can be employed. However, if the mixture is used, the mixture contains preferably at least 50 vol. %, more preferably at least 80 vol. %, of methanol or ethanol. Other low boiling point solvents are also employable in combination with the lower aliphatic alcohol. However, the other lower boiling point solvents in the combination preferably is in an amount of 30 vol. % or less.

The thermosetting solution composition of the invention can be easily prepared by the step comprising the following three steps:

(1) placing a biphenyltetracarboxylic acid compound containing at least 15 molar % of 2,3,3',4'-biphenyltetracarboxylic dianhydride and/or 2,2',3,3'-biphenyltetracarboxylic dianhydride, and 4-(2-phenylethynyl)phthalic dianhydride in an organic solvent comprising a lower aliphatic alcohol, to give a suspension;

(2) heating the suspension to give a solution in which a lower aliphatic alkyl ester of the biphenyltetracarboxylic acid compound and a lower aliphatic alkyl ester of 4-(2-phenylethynyl)phthalic acid are dissolved; and (3) mixing an aromatic diamine compound with the solution obtained in (2) above.

It has been noted that a thermosetting solution composition comprises methyl esters of the biphenyltetracarboxylic acid compound and 4-(2-phenylethynyl)phthalic acid, a prepreg prepared from the solution composition shows good form stability in the procedure of manufacturing a cured polyimide article under pressure at a high temperature. Accordingly, the lower aliphatic alkyl esters in the thermosetting solution composition preferably are methyl esters. However, if environmental pollution caused by evaporation of methanol in the manufacture of an aromatic polyimide article from the prepreg should be obviated, the free methanol can be removed from the prepreg by the following method:

preparing first a thermosetting solution composition using methanol;

drying the prepared thermosetting methanol solution composition to give a thermosetting powdery composition;

dissolving the thermosetting powdery composition in ethanol, to give a thermosetting ethanol solution composition; and preparing a prepreg from the thermosetting ethanol solution composition.

In the above-mentioned method, the thermosetting powdery composition is preferably prepared by heating the thermosetting methanol solution composition to a temperature of not higher than 60° C. The thermosetting powdery composition may contain a small amount of methanol.

The prepreg preferably contains a volatile component including a lower aliphatic alcohol in an amount of 18 to 25 wt. %, more preferably in an amount of 20 to 22 wt. %.

The thermosetting solution composition of the invention preferably further contains an imidazole compound in an amount of 0.01 to 3 wt. %, per the total amount of the reactive compounds (i.e., biphenyltetracarboxylic acid compound, 4-(2-phenylethynyl)phthalic acid compound, and aromatic diamine compound). In the preparation of the thermosetting solution composition, the imidazole compound serves to accelerate the dissolution of the placed acid components so that the dissolution can be complete within a shortened period of time. Further, the imidazole compound serves to accelerate thermosetting of the prepreg in the procedure that the prepreg is heated under pressure to manufacture a cured polyimide article. There are no specific limitation with respect to imidazole compounds. Examples of the imidazole compounds include known imidazole catalysts such as 2-methylimidazole and 1,2-dimethylimidazole.

In the thermosetting solution composition of the invention, the total amount of the aforementioned reactive compounds (i.e., biphenyltetracarboxylic acid compound, 4-(2-phenylethynyl)phthalic acid compound, and aromatic diamine compound) preferably is 30 to 80 wt. %, more preferably 35 to 75 wt. %, more preferably 40 to 75 wt. %, most preferably 45 to 75 wt. %.

A prepreg is prepared by impregnating a matrix sheet of high strength fibers with the thermosetting solution composition of the invention and heating the impregnated matrix sheet for removing a portion of the solvent by evaporation.

The prepreg should contain an appropriate amount of a volatile component and an appropriate amount of a resin component so that it can be easily handled for the manufacture of the cured polyimide article. The handling characteristics include drapeability and tackiness. Accordingly, the matrix sheet can be impregnated with the thermosetting solution composition by dip method or cast method, and then heated in a dry air oven to remove an excessive volatile component, so as to prepare an appropriate prepreg having a resin content (Rc) of 35 to 55 wt. % and a volatile content (Vc) of 10 to 25 wt. %. The heating procedure is generally carried out at a temperature in the range of 40 to 150° C., for 0.5 to 30 min.

The matrix sheet comprises known high strength fibers such as carbon fibers, aramide fibers, glass fibers, and ceramic fibers such as titanium dioxide fibers.

The prepreg of the invention can be heated to give a cured polyimide article having Tg of higher than 300° C. (or showing no Tg at temperatures of 300° C. or lower).

The prepreg preferably is in the form of a roll and is preferably coated on both surfaces with a covering sheet such as polyethylene terephthalate sheet and paper sheet for its storage and transportation.

The prepreg can be processed to give a cured resin article by a variety of know methods. For instance, a roll of prepreg is cut to give plural sheets having the desired size. The plural prepreg sheets (for instance, from several sheets to sheets of more than a hundred) are laminated one on another, and the formed prepreg laminate is heated under pressure by means of a hot press. In the procedure of heating under pressure, the thermosetting composition gives an aromatic polyimide article through thermal imidation reaction and curing reaction.

Figure 4:
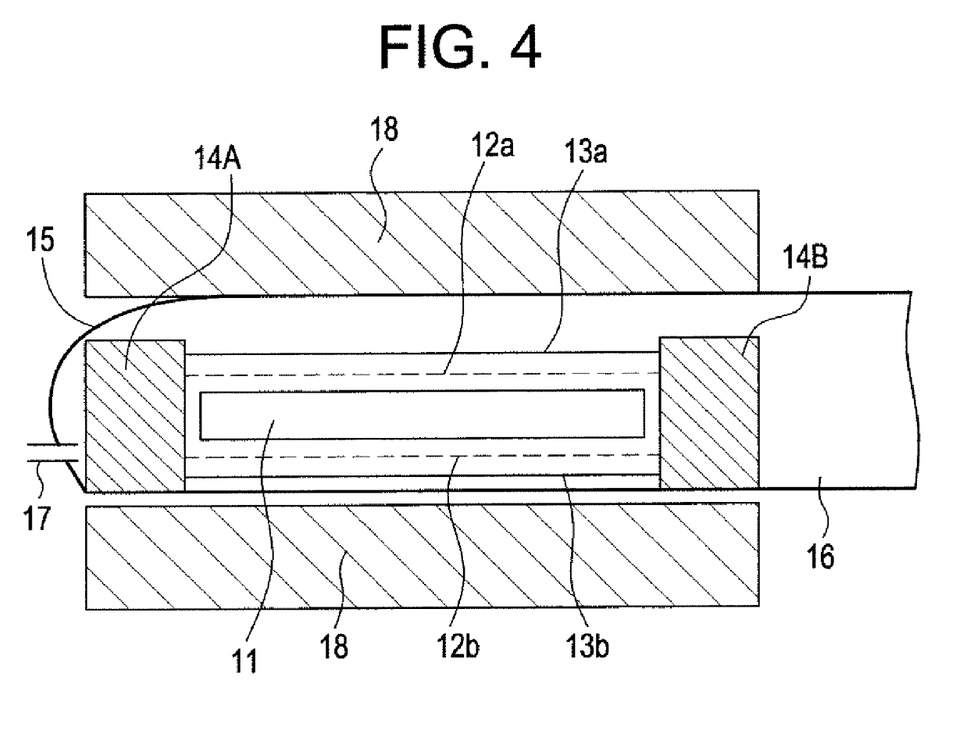
FIG. 4 illustrates an example for the procedure of manufacturing a cured article from a prepreg.
Figure 5:
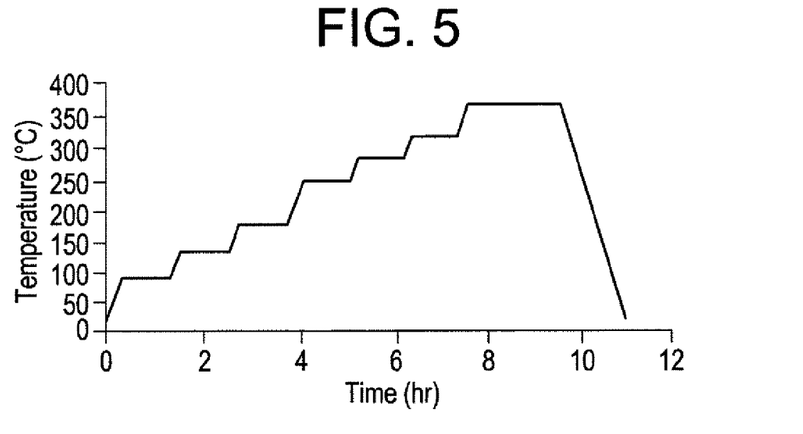
FIG. 5 illustrates a phased heating pattern employed in the procedure of manufacturing a cured article from a prepreg under vacuum which is performed varying the heating temperature and the degree of vacuum.
Figure 6:
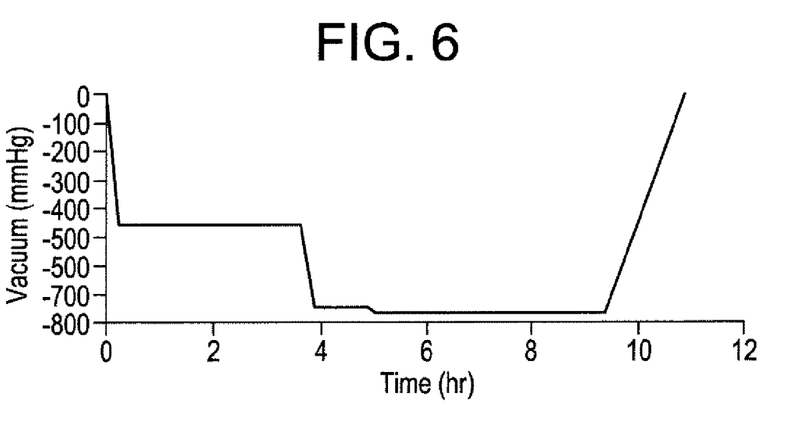
FIG. 6 illustrates a phased vacuum pattern employed in the procedure of manufacturing a cured article from a prepreg under vacuum which is performed varying the heating temperature and the degree of vacuum.
Figure 7:
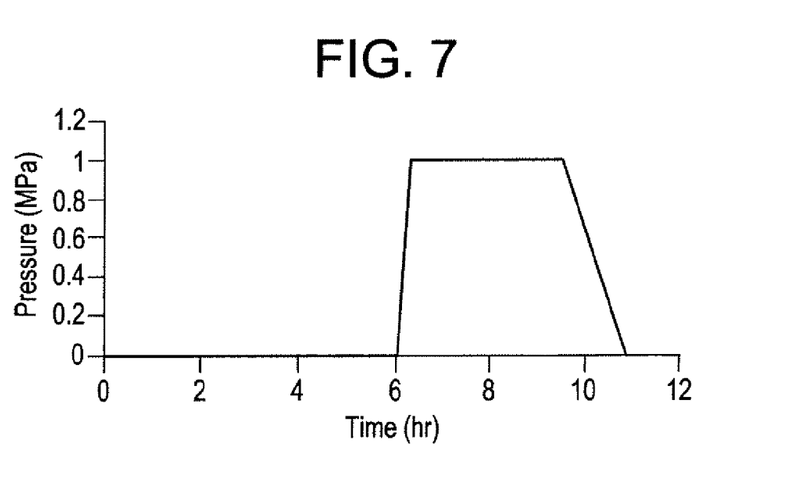
FIG. 7 illustrates a phased pressure pattern employed in the procedure of manufacturing a cured article from a prepreg under vacuum which is performed varying the heating temperature and the degree of vacuum.
Figure 8:
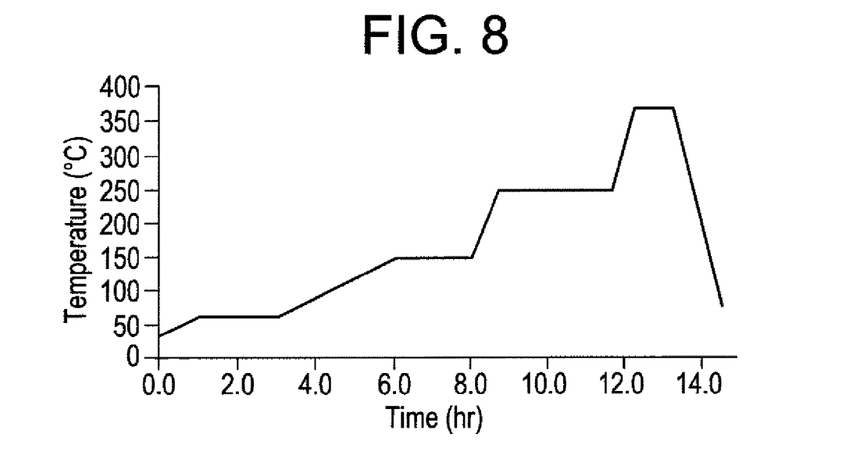
FIG. 8 illustrates another phased heating pattern employed in the procedure of manufacturing a cured article from a prepreg under vacuum which is performed varying the heating temperature and the degree of vacuum.
Figure 9:
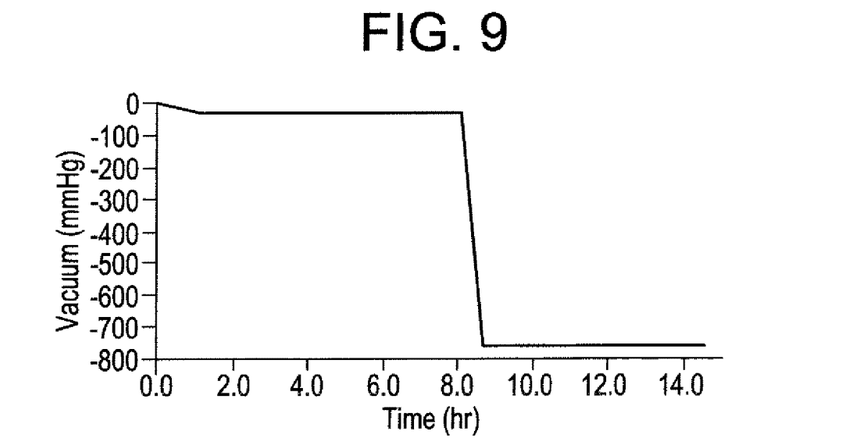
FIG. 9 illustrates another phased vacuum pattern employed in the procedure of manufacturing a cured article from a prepreg under vacuum which is performed varying the heating temperature and the degree of vacuum.
Figure 10:
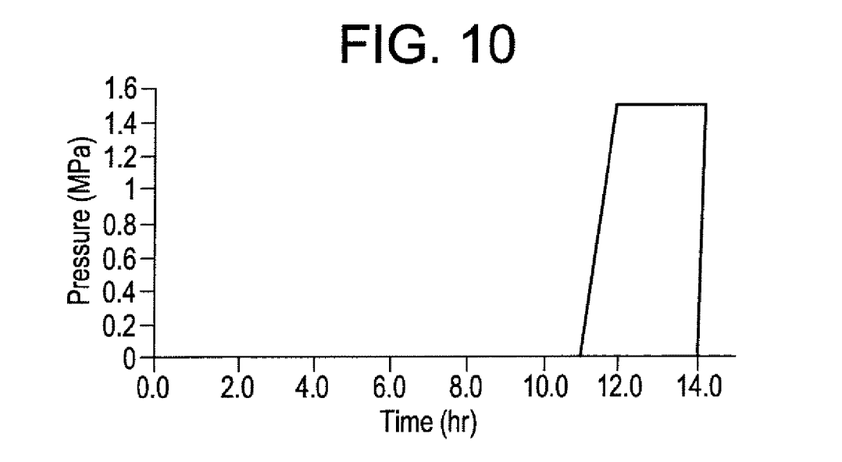
FIG. 10 illustrates another phased pressure pattern employed in the procedure of manufacturing a cured article from a prepreg under vacuum which is performed varying the heating temperature and the degree of vacuum.

For instance, the laminate of prepregs is heated under pressure in the manner as illustrated in FIG. 4. In more detail, the laminate of prepregs 11 are placed between a pair of air permeable sheets (such as polyethylene terephthalate sheets and glass sheets) 12*a*, 12*b*. On each of the air permeable sheets 12*a*, 12*b* is placed a release film 13*a*, 13*b*. Thus prepared laminate is placed between a pair of heat-resistant non-woven cloths (sponge materials) 14*a*,14*b*, and then is encase in a heat-resistant bag 15. The heat-resistant bag 15 is then sealed at the open end 16, for instance, by heat sealing. The inner space of the bag 15 is evacuated by withdrawing air through the evacuation pipe 17 by vacuum pump, while the enclosed laminate is heated under pressure. In the procedure of evacuation and heating under pressure, it is preferred to vary the degree of vacuum and temperature according the patterns illustrated in FIGS. 5 to 10.

The present invention is further described by the following non-limiting examples.

In the following examples, the measured values and calculated values are obtained in the following manners.

(1) Total Reactive Component Content in Solution

Total reactive component content (%)=100×[amounts (g) of the employed reactive components]/[amounts (g) of the employed reactive components+amount (g) of the solvent]

(2) Solution Viscosity

The solution viscosity was determined at 25° C. by means of an E-type viscometer (available from Tokyo Measuring Apparatus Co., Ltd.).

(3) Glass Transition Temperature (Tg) of Cured Resin Article

For the measurement, the cured resin article is heated in a nitrogen gas by means of SSC5200-DSC-3200 (available from Seiko-Instrument Co., Ltd.) at a temperature elevation rate of 20° C./min.

(4) Linear Expansion Coefficient of Cured Resin Article

For the measurement, the cured resin article is heated from 50° C. to 250° C. in a nitrogen gas by means of TMA-50 (available from Shimazu Seisakusho Co., Ltd.) at a temperature elevation rate of 5° C./min.

(5) Volatile Content (Vc) and Resin Content (Rc)

Vc(%)=100×[amount (g) of uncured prepreg−amount (g) of prepreg after heating at 370° C. for one hour]/[amount (g) of uncured prepreg]

Rc(%)=100×[amount (g) of prepreg after heating at 370° C. for one hour−amount (g) of matrix sheet]/[amount (g) of prepreg after heating at 370° C. for one hour]

(6) Complex Viscosity of Prepreg

A dynamic viscoelasticity is measured in a nitrogen atmosphere by means of a melt dynamic vicoelastometer (available from T. A. Instrument Japan Co., Ltd.) at a temperature elevation rate of 2° C./min.

(7) Thermal Decomposition Temperature of Resin Article

The heat treated resin article is heated in TG/DTA 6300 (available from S.I.I. Nanotechnology Co., Ltd) at a temperature elevation rate of 5° C./min. The temperature at which a weight loss of 5 wt. % is observed is recorded as the thermal decomposition temperature.

(8) Measurement of $^1$H-NMR Spectrum

The $^1$H-NMR spectrum was measured at a resonance frequency of 400 MHz in a deuterated methanol by means of a nuclear magnetic spectrometer EX-400 type, FT-NMR (available from JEOL, Ltd.).

In the following examples, the following monomer components (i.e., reactive components) were employed:

a-BPDA: 2,3,3',4'-biphenyltetracarboxylic dianhydride
s-BPDA: 3,3',4,4'-biphenyltetracarboxylic dianhydride
PEPA: 4-(phenylethynyl)phthalic anhydride
TPE-R: 1,3-bis(4-aminophenoxy)benzene
PPD: p-phenylene diamine
MPD: m-phenylene diamine Example 1

(1) Preparation of Thermosetting Solution Composition

In a four-necked 100 mL volume separable flask equipped with a stirrer, a reflux condenser and a nitrogen gas inlet were placed 11.77 g (0.0400 mol) of a-BPDA, 4.97 g (0.0200 mol) of PEPA, and 13.54 g of ethanol in a nitrogen gas stream. The resulting mixture was stirred under reflux for 5 hours to give a homogeneous solution. The solution was then cooled to room temperature. To the solution were added under stirring 6.58 g (0.0225 mol) of TPE-R and 2.97 g (0.0275 mol) of PPD. The resulting mixture was heated at 60° C. for 60 minutes to give a homogeneous solution (thermosetting solution composition).

The homogeneous solution was spread over a polyimide film (Upilex 125S, available from Ube Industries, Ltd.) and successively heated at 80° C. for 30 min., 135° C. for 30 min., 180° C. for 30 min., 250° C. for 30 min., 300° C. for 30 min., and 370° C. for 60 min., to give a clear resin film having a thickness of approx. 0.1 mm.

The viscosity of the homogeneous solution and Tg of the resin film are set forth in Table 1.

(2) Preparation of Prepreg

The above-mentioned homogeneous solution (thermosetting solution composition) was spread over a polyethylene terephthalate (PET) film to form a solution film. On the solution film was placed a carbon fiber cloth (FAW 198 g/m$^2$, plain cloth, T300-3K, available from Toray Corp.) having a size of 80 mm×100 mm. Thus prepared laminate was placed on a hot plate heated to 40° C. under the condition that the PET film was brought into contact with the hot plate. On the hot plate, the upper surface of the carbon fiber cloth was lightly pressed onto the PET film so that the cloth could be impregnated with the solution. Subsequently, the solution-impregnated carbon cloth was separated from the PET film, and dried by hanging it for 3 minutes in a hot air oven heated to 100° C. The dry carbon cloth was taken out of the oven, placed between a pair of PET film (thickness: 25 μm), and pressed at a pressure of 0.1 MPa for one minute by means of a hot press heated to 80° C. Thus, a prepreg was prepared.

(3) Manufacture of Cured Resin Sheet

The prepreg was successively heated at 135° C. for 30 min., 180° C. for 30 min., 250° C. for 30 min., 300° C. for 30 min., and 370° C. for 60 min., to manufacture a cured resin sheet.

The volatile content (Vc) and resin content (Rc) were determined from the data measured in the procedure of manufacturing the cured resin sheet from the prepreg. The determined Vc and Rc are set forth in Table 2.

Example 2

(1) Preparation of Thermosetting Solution Composition

The procedures of Example 1-(1) were repeated except that the TPE-R, PPD and ethanol were used in amounts of 4.39 g (0.0150 mol), 3.78 g (0.0350 mol), and 11.72 g, respectively, to give a homogeneous solution (thermosetting solution composition). Further, the homogeneous solution was processed in the same manner as in Example 1-(1), to give a clear resin film (thickness: approx. 0.1 mm).

The viscosity of the homogeneous solution and Tg of the resin film are set forth in Table 1.

(2) Preparation of Prepreg

The procedures of Example 1-(2) were repeated using the homogeneous solution prepared in (1) above, to prepare a prepreg.

Figure 1:
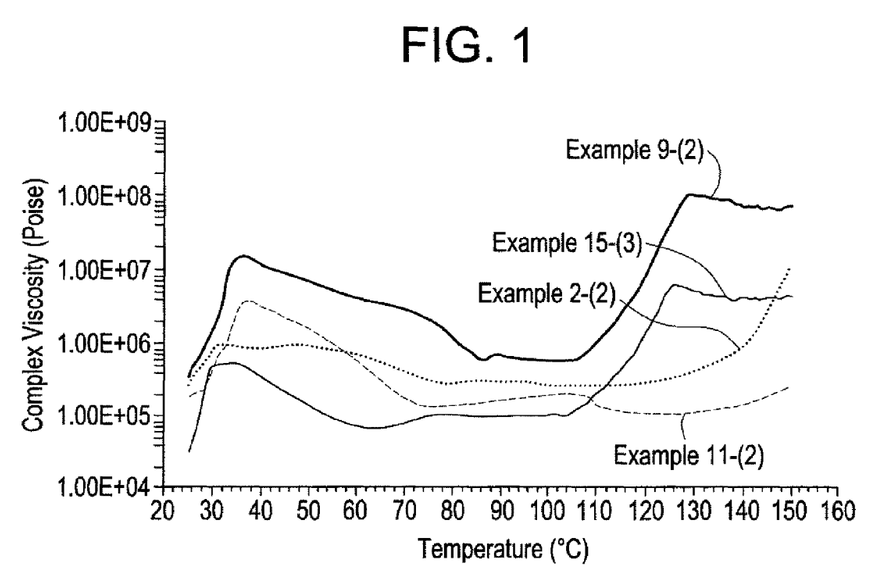
FIG. 1 is a graph showing results of dynamic viscoelasticity measurements (indicating relationships between temperature and complex viscosity).

The prepreg was subjected to measurement of dynamic viscoelasticity. The measured viscoelasticity is shown in FIG. 1.

(3) Manufacture of Cured Resin Sheet

The procedures of Example 1-(3) were repeated using the prepreg prepared in (2) above, to manufacture a cured resin sheet.

The volatile content (Vc) and resin content (Rc) were determined from the data measured in the procedure of manufacturing the cured resin sheet from the prepreg. The determined Vc and Rc are set forth in Table 2.

Example 3

(1) Preparation of Thermosetting Solution Composition

The procedures of Example 1-(1) were repeated except that the a-BPDA, s-BPDA, PEPA and ethanol were used in amounts of 5.89 g (0.0200 mol), 5.89 g (0.0200 mol), 4.97 g (0.0200 mol), and 12.37 g, respectively, to give a homogeneous solution (thermosetting solution composition). Further, the homogeneous solution was processed in the same manner as in Example 1-(1), to give a clear resin film (thickness: approx. 0.1 mm).

The viscosity of the homogeneous solution and Tg of the resin film are set forth in Table 1.

(2) Preparation of Prepreg

The procedures of Example 1-(2) were repeated using the homogeneous solution prepared in (1) above, to prepare a prepreg.

(3) Manufacture of Cured Resin Sheet

The procedures of Example 1-(3) were repeated using the prepreg prepared in (2) above, to manufacture a cured resin sheet.

The volatile content (Vc) and resin content (Rc) were determined from the data measured in the procedure of manufacturing the cured resin sheet from the prepreg. The determined Vc and Rc are set forth in Table 2.

Example 4

(1) Preparation of Thermosetting Solution Composition

The procedures of Example 1-(1) were repeated except that the a-BPDA, s-BPDA, PEPA and ethanol were used in amounts of 3.53 g (0.0120 mol), 8.24 g (0.0280 mol), 4.97 g (0.0200 mol), and 11.27 g, respectively, to give a homogeneous solution (thermosetting solution composition). Further, the homogeneous solution was processed in the same manner as in Example 1-(1), to give a clear resin film (thickness: approx. 0.1 mm).

The viscosity of the homogeneous solution and Tg of the resin film are set forth in Table 1.

(2) Preparation of Prepreg

The procedures of Example 1-(2) were repeated using the homogeneous solution prepared in (1) above, to prepare a prepreg.

(3) Manufacture of Cured Resin Sheet

The procedures of Example 1-(3) were repeated using the prepreg prepared in (2) above, to manufacture a cured resin sheet.

The volatile content (Vc) and resin content (Rc) were determined from the data measured in the procedure of manufacturing the cured resin sheet from the prepreg. The determined Vc and Rc are set forth in Table 2.

Example 5

(1) Preparation of Thermosetting Solution Composition

The procedures of Example 1-(1) were repeated except that the TPE-R, MPD (in place of PPD) and ethanol were used in amounts of 2.07 g (0.0070 mol), 4.66 g (0.0430 mol) and 12.64 g, respectively, to give a homogeneous solution (thermosetting solution composition). Further, the homogeneous solution was processed in the same manner as in Example 1-(1), to give a clear resin film (thickness: approx. 0.1 mm).

The viscosity of the homogeneous solution and Tg of the resin film are set forth in Table 1.

(2) Preparation of Prepreg

The procedures of Example 1-(2) were repeated using the homogeneous solution prepared in (1) above, to prepare a prepreg.

(3) Manufacture of Cured Resin Sheet

The procedures of Example 1-(3) were repeated using the prepreg prepared in (2) above, to manufacture a cured resin sheet.

The volatile content (Vc) and resin content (Rc) were determined from the data measured in the procedure of manufacturing the cured resin sheet from the prepreg. The determined Vc and Rc are set forth in Table 2.

In this example, the following cured resin sheet was further manufactured.

(4) Manufacture of Cured Resin Sheet

A carbon fiber cloth (FAW 198 g/m$^2$, plain cloth, T300-3K, available from Toray Corp.) was placed in a dry air oven parged with a nitrogen gas, and heated at 350° C. for 30 minutes. By measuring the weight loss of the carbon fiber cloth after the heat treatment, it was confirmed that 0.7 wt. % of a sizing agent was removed.

The procedures of Example 5-(2) and 5-(3) were repeated using the heat treated carbon fiber cloth and the homogeneous solution of Example 5-(1), to prepare a prepreg and then manufacture a cured resin sheet.

The volatile content (Vc) and resin content (Rc) were determined from the data measured in the procedure of manufacturing the cured resin sheet from the prepreg. The determined Vc was 5 wt. % and Rc was 39 wt. %.

(5) Manufacture of Cured Resin Sheet

The procedures of Example 5-(2) and 5-(3) were repeated using Tirano fiber cloth (titanium dioxide fiber cloth, FAW 328 g/m$^2$, plain cloth, PM-S17E08PX, available from Ube Industries, Ltd.) and the homogeneous solution of Example 5-(1), to prepare a prepreg and then manufacture a cured resin sheet.

The volatile content (Vc) and resin content (Rc) were determined from the data measured in the procedure of manufacturing the cured resin sheet from the prepreg. The determined Vc was 16 wt. % and Rc was 39 wt. %.

(6) Manufacture of Cured Resin Sheet

Ten g (10 g) of the homogeneous solution prepared in Example 5-(1) was diluted with 2.5 g of methyl ethyl ketone. The resulting solution was a homogeneous solution.

The procedures of Example 5-(2) and 5-(3) were repeated using the above-mentioned homogeneous solution, to prepare a prepreg and then manufacture a cured resin sheet.

The volatile content (Vc) and resin content (Rc) were determined from the data measured in the procedure of manufacturing the cured resin sheet from the prepreg. The determined Vc was 15 wt. % and Rc was 39 wt. %.

Example 6

(1) Preparation of Thermosetting Solution Composition

The procedures of Example 1-(1) were repeated using 11.06 g (0.0376 mol) of a-BPDA, 16.55 g (0.0667 mol) of PEPA, 10.38 g (0.0355 mol) of TPE-R, 3.84 g (0.0355 mol) of MPD, and 17.09 g of ethanol, to give a homogeneous solution (thermosetting solution composition). Further, the homogeneous solution was processed in the same manner as in Example 1-(1), to give a clear resin film (thickness: approx. 0.1 mm).

The viscosity of the homogeneous solution and Tg of the resin film are set forth in Table 1.

(2) Preparation of Prepreg

The procedures of Example 1-(2) were repeated using the homogeneous solution prepared in (1) above, to prepare a prepreg.

(3) Manufacture of Cured Resin Sheet

The procedures of Example 1-(3) were repeated using the prepreg prepared in (2) above, to manufacture a cured resin sheet.

The volatile content (Vc) and resin content (Rc) were determined from the data measured in the procedure of manufacturing the cured resin sheet from the prepreg. The determined Vc and Rc are set forth in Table 2.

Example 7

(1) Preparation of Thermosetting Solution Composition

The procedures of Example 1-(1) were repeated using 15.59 g (0.0530 mol) of a-BPDA, 23.33 g (0.0940 mol) of PEPA, 14.62 g (0.0500 mol) of TPE-R, 2.70 g (0.0250 mol) of PPD, 2.70 g (0.0250 mol) of MPD, and 25.26 g of ethanol, to give a homogeneous solution (thermosetting solution composition). Further, the homogeneous solution was processed in the same manner as in Example 1-(1), to give a clear resin film (thickness: approx. 0.1 mm).

The viscosity of the homogeneous solution and Tg of the resin film are set forth in Table 1.

(2) Preparation of Prepreg

The procedures of Example 1-(2) were repeated using the homogeneous solution prepared in (1) above, to prepare a prepreg.

(3) Manufacture of Cured Resin Sheet

The procedures of Example 1-(3) were repeated using the prepreg prepared in (2) above, to manufacture a cured resin sheet.

The volatile content (Vc) and resin content (Rc) were determined from the data measured in the procedure of manufacturing the cured resin sheet from the prepreg. The determined Vc and Rc are set forth in Table 2.

Example 8

(1) Preparation of Thermosetting Solution Composition

The procedures of Example 1-(1) were repeated except that TPE-R was not used, and that the PPD and ethanol were used in amounts of 5.41 g (0.0500 mol) and 14.46 g, respectively, to give a homogeneous solution (thermosetting solution composition). Further, the homogeneous solution was processed in the same manner as in Example 1-(1), to give a clear resin film (thickness: approx. 0.1 mm).

The viscosity of the homogeneous solution and Tg of the resin film are set forth in Table 1.

(2) Preparation of Prepreg

The procedures of Example 1-(2) were repeated using the homogeneous solution prepared in (1) above, to prepare a prepreg.

(3) Manufacture of Cured Resin Sheet

The procedures of Example 1-(3) were repeated using the prepreg prepared in (2) above, to manufacture a cured resin sheet.

The volatile content (Vc) and resin content (Rc) were determined from the data measured in the procedure of manufacturing the cured resin sheet from the prepreg. The determined Vc and Rc are set forth in Table 2.

Example 9

(1) Preparation of Thermosetting Solution Composition

In a four-necked 2,000 mL volume separable flask equipped with a stirrer, a reflux condenser and a nitrogen gas inlet were placed 294.22 g (1.000 mol) of a-BPDA, 124.12 g (0.500 mol) of PEPA, and 415.06 g of methanol in a nitrogen gas stream. The resulting mixture was stirred under reflux for 5 hours to give a homogeneous solution (the mixture turned into a homogeneous solution within approx. 3 hours, but the stirring under reflux was continued for additional 2 hours. The solution was then cooled to room temperature. To the solution were added under stirring 109.63 g (0.375 mol) of TPE-R and 94.62 g (0.875 mol) of PPD. The resulting mixture was heated at 60° C. for 60 minutes to give a homogeneous solution (thermosetting solution composition). Further, the homogeneous solution was processed in the same manner as in Example 1-(1), to give a clear resin film (thickness: approx. 0.1 mm).

The viscosity of the homogeneous solution and Tg of the resin film are set forth in Table 1.

(2) Preparation of Prepreg

The above-mentioned homogeneous solution (thermosetting solution composition) was spread over a polyethylene terephthalate (PET) film to form a solution film. On the solution film was placed a carbon fiber cloth (FAW 320 g/m$^2$, plain cloth, T800-12K, available from Toray Corp.) having a size of 320 mm×320 mm. Thus prepared laminate was placed on a hot plate heated to 40° C. under the condition that the PET film was brought into contact with the hot plate. On the hot plate, the upper surface of the carbon fiber cloth was lightly pressed onto the PET film so that the cloth could be impregnated with the solution. Subsequently, the solution-impregnated carbon cloth was separated from the PET film, and dried by hanging it for 3 minutes in a hot air oven heated to 90° C. The dry carbon cloth was taken out of the oven, placed between a pair of PET film (thickness: 25 μm), and pressed at a pressure of 0.1 MPa for one minute by means of a hot press heated to 80° C. Thus, a prepreg was prepared.

Thus prepared prepreg showed good tackiness and drapeability.

The prepreg was subjected to measurement of dynamic viscoelasticity. The measured viscoelasticity is shown in FIG. 1.

(3) Manufacture of Cured Resin Sheet

The prepreg was successively heated at 135° C. for 30 min., 180° C. for 30 min., 250° C. for 30 min., 300° C. for 30 min., and 370° C. for 60 min., to manufacture a cured resin sheet.

The volatile content (Vc) and resin content (Rc) were determined from the data measured in the procedure of manufacturing the cured resin sheet from the prepreg. The determined Vc and Rc are set forth in Table 2.

Example 10

(1) Preparation of Thermosetting Solution Composition

In the same separable flask as that described in Example 9-(1) were placed 294.22 g (1.000 mol) of a-BPDA, 124.12 g (0.500 mol) of PEPA, 1.25 g of 2-methylimidazole, and 415.06 g of methanol in a nitrogen gas stream. The resulting mixture was stirred under reflux for 3 hours to give a homogeneous solution (the mixture turned into a homogeneous solution within approx. 1 hour, but the stirring under reflux was continued for additional 2 hours. The solution was then cooled to room temperature. To the solution were added under stirring 109.63 g (0.375 mol) of TPE-R and 94.62 g (0.875 mol) of PPD. The resulting mixture was heated at 60° C. for 60 minutes to give a homogeneous solution (thermosetting solution composition).

Figure 2:
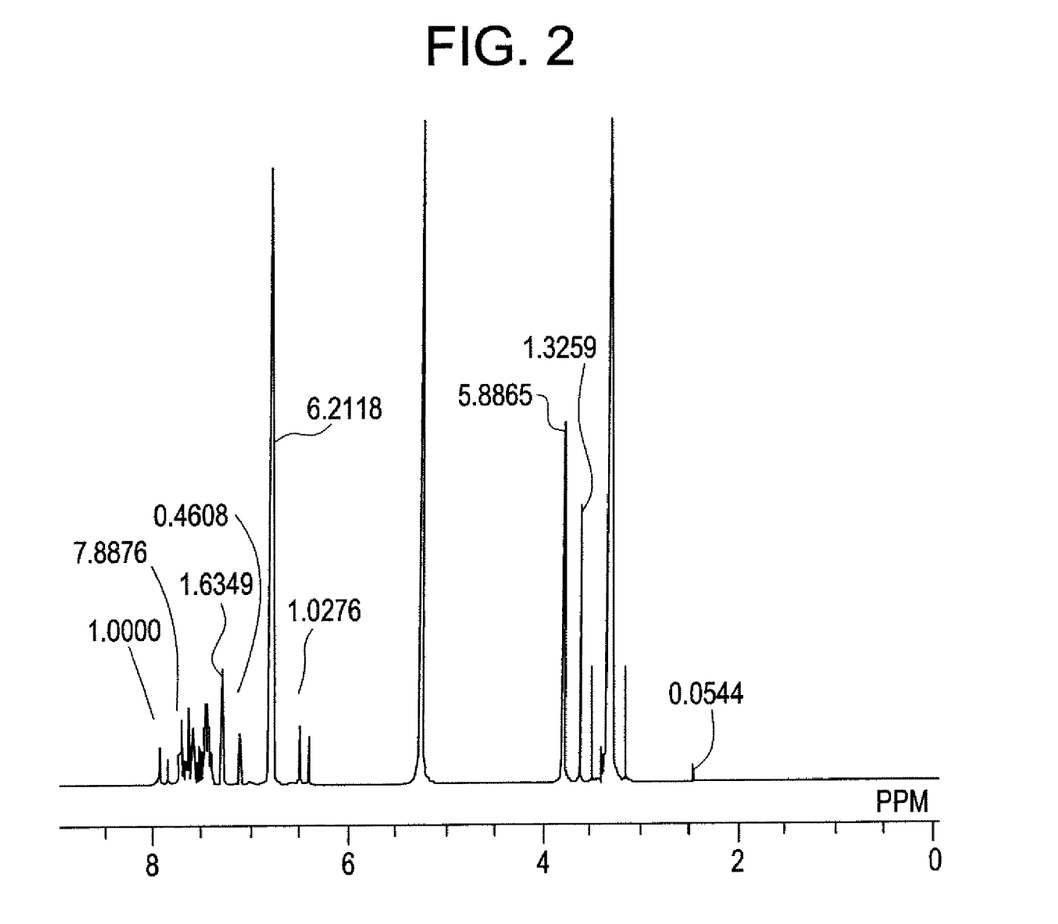
FIG. 2 is $^1$H-NMR spectrum of the thermosetting solution composition of Example 10(1).

The homogeneous solution was subjected to measurement of $^1$H-NMR spectrum. The $^1$H-NMR spectrum is seen in FIG. 2.

Further, the homogeneous solution was processed in the same manner as in Example 1-(1), to give a clear resin film (thickness: approx. 0.1 mm).

The viscosity of the homogeneous solution and Tg of the resin film are set forth in Table 1.

The other physical characteristics of the resin film are set forth below:

tensile strength: 127 MPa (at 23° C., according to ASTM D 882)

tensile modulus: 2.8 GPa (at 23° C., according to ASTM D 882)

breaking extension: 13% (at 23° C., according to ASTM D 882)

water absorption: 2.2% (at 23° C., saturation absorption, according to ASTM D 570)

thermal decomposition temperature: 563° C.

linear expansion coefficient: 51 ppm

(2) Preparation of Prepreg

The procedures of Example 1-(2) were repeated using the homogeneous solution prepared in (1) above, to prepare a prepreg.

(3) Manufacture of Cured Resin Sheet

The procedures of Example 1-(3) were repeated using the prepreg prepared in (2) above, to manufacture a cured resin sheet.

The volatile content (Vc) and resin content (Rc) were determined from the data measured in the procedure of manufacturing the cured resin sheet from the prepreg. The determined Vc and Rc are set forth in Table 2.

Example 11

(1) Preparation of Thermosetting Solution Composition

In the same separable flask as that described in Example 9-(1) were placed 294.22 g (1.000 mol) of a-BPDA, 124.12 g (0.500 mol) of PEPA, 1.25 g of 2-methylimidazole, and 415.06 g of n-propanol in a nitrogen gas stream. The resulting mixture was stirred under reflux for 3 hours to give a homogeneous solution (the mixture turned into a homogeneous solution within approx. 1 hour, but the stirring under reflux was continued for additional 2 hours. The solution was then cooled to room temperature. To the solution were added under stirring 109.63 g (0.375 mol) of TPE-R and 94.62 g (0.875 mol) of PPD. The resulting mixture was heated at 60° C. for 60 minutes to give a homogeneous solution (thermosetting solution composition). Further, the homogeneous solution was processed in the same manner as in Example 1-(1), to give a clear resin film (thickness: approx. 0.1 mm).

The viscosity of the homogeneous solution and Tg of the resin film are set forth in Table 1.

(2) Preparation of Prepreg

The procedures of Example 9-(2) were repeated except that the homogeneous solution prepared in (1) above was used, and the drying procedure was performed at 100° C. for 15 minutes, to prepare a prepreg.

Thus prepared prepreg showed good tackiness and drapeability.

The prepreg was subjected to measurement of dynamic viscoelasticity. The measured viscoelasticity is shown in FIG. 1.

(3) Manufacture of Cured Resin Sheet

The procedures of Example 9-(3) were repeated using the prepreg prepared in (2) above, to manufacture a cured resin sheet.

The volatile content (Vc) and resin content (Rc) were determined from the data measured in the procedure of manufacturing the cured resin sheet from the prepreg. The determined Vc and Rc are set forth in Table 2.

TABLE 1

|  | Monomer content (wt. %) | Solution viscosity (poise) | Tg of cured sheet (° C.) |
|---|---|---|---|
| Example 1 | 66 | 105 | 323 |
| Example 2 | 68 | 112 | 365 |
| Example 3 | 68 | 107 | 319 |
| Example 4 | 70 | 106 | 321 |
| Example 5 | 65 | 107 | 342 |
| Example 6 | 71 | 115 | 317 |
| Example 7 | 70 | 110 | 336 |
| Example 8 | 60.5 | 106 | *1 |

TABLE 1-continued

| | Monomer content (wt. %) | Solution viscosity (poise) | Tg of cured sheet (° C.) |
|---|---|---|---|
| Example 9 | 60 | 2.0 | 357 |
| Example 10 | 60 | 2.2 | 357 |
| Example 11 | 60 | 113 | 357 |

Remarks:
The monomer content means the concentration of the reactive components in the thermosetting solution composition.
*1 means that no clear Tg was observed at temperatures below 400° C.

TABLE 2

| Homogeneous solution | Vc (wt. %) | Rc (wt. %) |
|---|---|---|
| Example 1 | 16 | 39 |
| Example 2 | 15 | 39 |
| Example 3 | 16 | 40 |
| Example 4 | 15 | 39 |
| Example 5 | 15 | 38 |
| Example 6 | 15 | 39 |
| Example 7 | 16 | 39 |
| Example 8 | 15 | 39 |
| Example 9 | 13 | 41 |
| Example 10 | 13 | 41 |
| Example 11 | 14 | 36 |

The following examples 12 and 13 describe the preparation of the cured resin article in the manner as illustrated in FIG. 4.

Example 12

The prepreg prepared in Example 5-(2) was cut to give 16 prepreg sheets, each having a size of 50 mm×60 mm. The 16 prepreg sheets were laminated one on another, and thus prepared laminate was placed in the heat-resistant bag (as is illustrated in FIG. 4). The open end of the bag was sealed by heat sealing, and the bag was placed in a hot press. The laminate in the bag was so heated under pressure, under the conditions of the degree of vacuum in the bag and the heating temperature that the historical curve in FIGS. 5 to 7 could be satisfied. Thus, a cured resin article was manufactured.

The cured resin article was subjected to measurement of the interlaminar shear strength at 23° C. according to ASTM D2344, to give a shear strength of 60 MPa. The cured resin article was further subjected to detection of flaw by means of a supersonic flaw detector. No significant flaw was detected.

Example 13

The prepreg prepared in Example 9-(2) was cut to give 12 prepreg sheets, each having a size of 300 mm×300 mm. The 12 prepreg sheets were laminated one on another, and thus prepared laminate was placed in the heat-resistant bag (as is illustrated in FIG. 4). The open end of the bag was sealed by heat sealing, and the bag was placed in a hot press. The laminate in the bag was so heated under pressure, under the conditions of the degree of vacuum in the bag and the heating temperature that the historical curve in FIGS. 8 to 10 could be satisfied. Thus, a cured resin article was manufactured.

The cured resin article contained the carbon fiber matrix of 59 vol. % and a void volume of 0.5 vol. %. The carbon fiber matrix content and void volume were determined according to ASTM D3171.

Then, the cured resin article was subjected to detection of flaw by means of a supersonic flaw detector. No significant flaw was detected.

The physical characteristics of the cured resin article are set forth below:
Flexural strength (according to ASTM D790):
815 MPa (at 23° C.), 479 MPa (at 288° C.)
Flexural modulus (according to ASTM D790):
61.9 GPa (at 23° C.), 62.0 GPa (at 288° C.)
Interlaminar shear strength (according to ASTM D2344):
68.8 MPa (at 23° C.), 38.2 MPa (at 288° C.)

The cured resin article was further heated at 357° C. for 6 hours in an hot air oven. Thus heated article was subjected to measurement of the interlaminar shear strength. The results were set forth below.
Interlaminar shear strength (according to ASTM D2344):
49.6 MPa (at 23° C.), 33.9 MPa (at 288° C.)

The following examples 14 and 15 describe the preparation of a thermosetting powder composition, the preparation of a thermosetting solution composition from the powdery composition, the preparation of a prepreg from the prepared thermosetting solution composition, and the manufacture of a cured resin article.

Example 14

(1) Preparation of Thermosetting Powder Composition 40.00 g of the homogeneous solution (thermosetting solution composition) prepared in Example 10-(1) was placed in a 500 mL volume eggplant-type flask. The flask was dipped in a water bath heated to 40° C., and the flask was evacuated for 3 hours by an evaporator to remove methanol. Thus, a powdery composition (thermosetting powder composition) was prepared.

The powdery composition was examined in the following manner.

A polyimide film having a size of 300 mm×300 mm and a air permeable tetrafluoroethylene/glass sheet having the same size and a thickness of 2 mm is placed on a stainless steel plate having the same size in order. On the air permeable sheet was placed a stainless steel frame (width 50 mm, length 100 mm, thickness 3 mm). The powder composition was placed in the frame. On the frame were placed in order the same air permeable tetrafluoroethylene/glass sheet, polyimide film and stainless steel plate so as to cover the frame. The frame with the covering sheets was placed in a high temperature vacuum press (KVHC-PRESS, available from Kitagawa Seiki Co., Ltd.) and heated from room temperature to 250° C. for 3 hours and further at 250° C. for 2 hours. The vacuum press was evacuated to make the inner space a vacuum of 2 Torr for 30 minutes. Thereafter, the powdery composition in the frame was heated to 370° C. for 24 minutes under 5 MPa, and kept under the condition for one hour. The composition was then cooled in vacuum to 30° C. under pressure, to give a resin plate (width 50 mm, length 100 mm, thickness 3 mm).

The resin plate was cut to a piece of 50 mm×50 mm, and subjected to the following measurement of heat loss.
Weight loss after heat treating:
0.60% (300° C., 500 hours, in air)
0.15% (275° C., 500 hours, in air)

Example 15

(1) Preparation of Thermosetting Powder Composition 20.00 g of the homogeneous solution (thermosetting solution composition) prepared in Example 10-(1) was placed in a 300 mL volume eggplant-type flask. The flask was dipped in a water bath heated to 40° C., and the flask was evacuated for 3 hours by an evaporator to remove methanol. Thus, 14.2 g of a powdery composition (thermosetting powder composition) was prepared.

Figure 3:
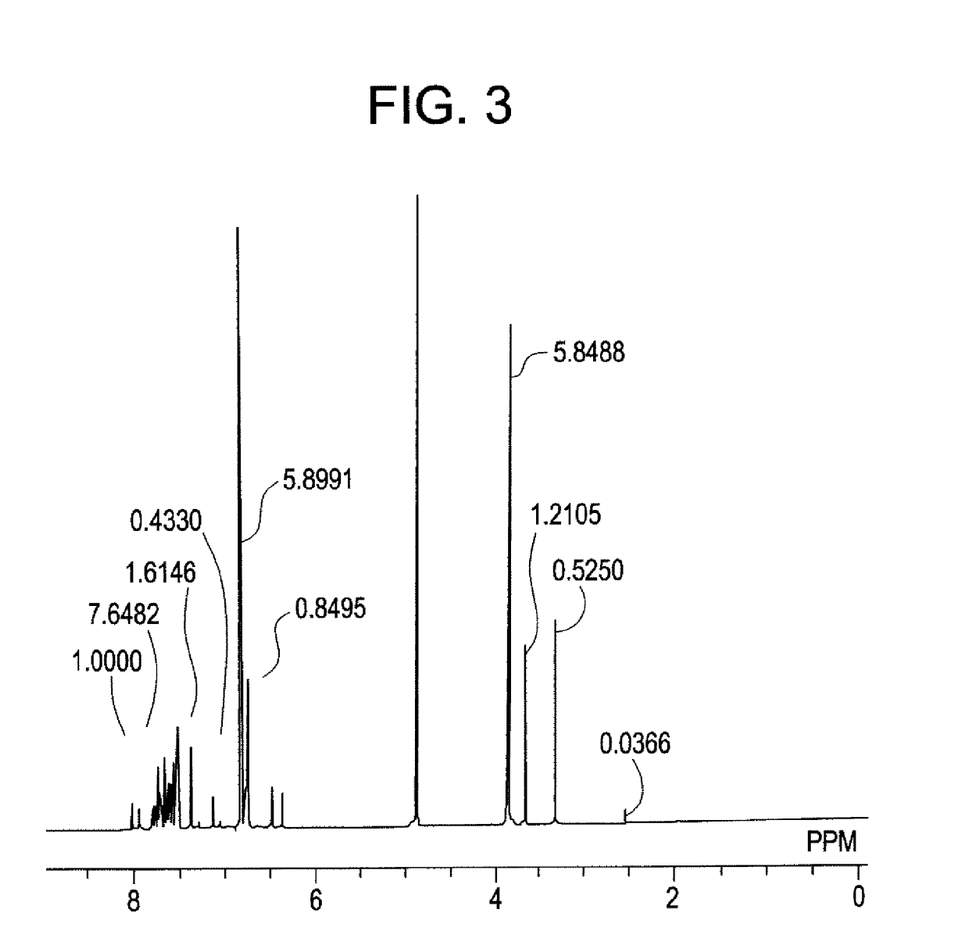
FIG. 3 is $^1$H-NMR spectrum of the thermosetting solution composition of Example 15(1).

The homogeneous solution was subjected to measurement of $^1$H-NMR spectrum. The $^1$H-NMR spectrum is seen in FIG. 3.

(2) Preparation of Thermosetting Solution Composition from Thermosetting Powder Composition In 4.59 g of ethanol was dissolved 13.78 g of the powdery composition (thermosetting powder composition) obtained in (1) above, to give a homogeneous solution (thermosetting solution composition).

(3) Preparation of Prepreg

A prepreg was prepared in the manner as described in Example 1-(2) using the ethanolic solution composition prepared in (2) above.

Thus prepared prepreg showed good tackiness and drapeability.

The prepreg was subjected to measurement of dynamic viscoelasticity. The measured viscoelasticity is shown in FIG. 1.

(4) Manufacture of Cured Resin Sheet

The procedures of Example 1-(3) were repeated using the prepreg prepared in (3) above, to manufacture a cured resin sheet.

The volatile content (Vc) and resin content (Rc) were determined from the data measured in the procedure of manufacturing the cured resin sheet from the prepreg. It was determined that Vc was 15% and Rc was 41%.

(5) Concentration Dependency and Temperature Dependency of Solution Viscosity of Thermosetting Solution Composition The thermosetting powder composition prepared in Example 14-(1) was dissolved in ethanol to give homogeneous solutions having different concentrations. The relationship between the concentration of the solution and the solution viscosity is set forth below.

| Concentration of powder (wt. %) | Solution viscosity (30° C., poise) | Imide content (wt. %) |
| --- | --- | --- |
| 50 | 0.3 | 40 |
| 62.5 | 1.9 | 50 |
| 75 | 54 | 60 |

Remarks: The imide content was determined by the following method: The powdery composition (thermosetting powder composition) was processed to give a fully imidized product which was then heated at 250° C. for 30 minutes to completely remove methanol; the weight of the imidized product was measured, and a ratio of weight loss from the powder composition to the imidized product was calculated. The imide content was calculated by the following equation:

Imide content (%)=Concentration of powder (%)×(1−ratio of weight loss)

The thermosetting solution composition (concentration of 62.5 wt. % in ethanol) prepared from the thermosetting powder composition in Example 14-(1) was subjected to measurement of temperature dependency of solution viscosity. The results are set forth below.

| Temperature (° C.) | Solution viscosity (poise, 30° C.) |
| --- | --- |
| 20 | 4.5 |
| 30 | 1.9 |
| 40 | 1.0 |
| 50 | 0.6 |

Comparison Example 1

The procedures of Example 1-(1) were repeated except for replacing a-BPDA (0.0400 mol) with s-BPDA (11.77 g, 0.0400 mol), to prepare a homogeneous solution. A portion of the homogeneous solution was spread on a polyimide film in the same manner as in Example 1-(1) and heated at 80° C. for 30 min., 135° C. for 30 min., 180° C. for 30 min., 250° C. for 30 min., 300° C. for 30 min., and 370° C. for 60 min. In the course of the beating, the solution film turned into an opaque and brittle film.

What is claimed is:

1. A process for preparing a thermosetting solution composition comprising a biphenyltetracarboxylic acid compound containing at least 15 mol % of a partial lower aliphatic alkyl ester of 2,3,3',4'-biphenyltetracarboxylic acid and/or a partial lower aliphatic alkyl ester of 2,2',3,3'-biphenyltetracarboxylic acid, an aromatic diamine compound in a molar amount larger than a molar amount of the biphenyltetracarboxylic acid compound, said aromatic diamine compound being selected from the group consisting of p-phenylenediamine, m-phenylenediamine, 1,3-bis(4-aminophenoxy)benzene and a mixture thereof, and a partial lower aliphatic alkyl ester of 4-(2-phenylethynyl)phthalic acid compound in a molar amount as much as 1.8-2.2 times a molar amount corresponding to a difference between the molar amount of the aromatic diamine compound and the molar amount of the biphenyltetracarboxylic acid compound dissolved in an organic solvent comprising a lower aliphatic alcohol, in which a total amount of the biphenyltetracarboxylic acid compound, 4-(2-phenylethynyl)phthalic acid compound and aromatic diamine compound is in the range of 30 to 80 wt. % based on an amount of the thermosetting solution composition, which comprises the steps of:

placing a biphenyltetracarboxylic acid compound containing at least 15 molar % of 2,3,3',4'-biphenyltetracarboxylic dianhydride and/or 2,2',3,3'-biphenyltetracarboxylic dianhydride, and 4-(2-phenylethynyl)phthalic anhydride in the organic solvent, to give a suspension;

heating the suspension to give a solution in which the partial lower aliphatic alkyl ester of the biphenyltetracarboxylic acid compound and the partial lower aliphatic alkyl ester of 4-(2-phenylethynyl)phthalic acid are dissolved; and mixing the aromatic diamine compound with the solution obtained above.

2. The process of claim 1, in which each of the partial lower aliphatic alkyl esters is methyl ester and the lower aliphatic alcohol is methanol.

3. The process of claim 1, in which each of the partial lower aliphatic alkyl ester is ethyl esters and the lower aliphatic alcohol is ethanol.

4. The process of claim 1, in which the aromatic diamine compound is p-phenylenediamine, 1,3-bis(4-aminophenoxy)-benzene or a mixture thereof.

5. The process of claim 1, in which the aromatic diamine compound comprises a mixture of p-phenylenediamine and 1,3-bis(4-aminophenoxy)benzene wherein p-phenylenediamine is present in an amount of 50 to 70 molar %.

6. The process of claim 1, in which a total amount of the biphenyltetracarboxylic acid compound, the aromatic diamine compound, and 2-(2-phenylethynyl)phthalic acid compound is in the range of 30 to 80 wt. %, per the amount of the solution composition.

7. A process for preparing a thermosetting solution composition comprising a biphenyltetracarboxylic acid compound containing at least 15 mol % of a partial methyl ester of 2,3,3',4'-biphenyltetracarboxylic acid and/or a partial methyl ester of 2,2',3,3'-biphenyltetracarboxylic acid, an aromatic diamine compound in a molar amount larger than a molar amount of the biphenyltetracarboxylic acid compound, said aromatic diamine compound being selected from the group consisting of p-phenylenediamine, m-phenylenediamine, 1,3-bis(4-aminophenoxy)benzene and a mixture thereof, and a partial methyl ester of 4-(2-phenylethynyl)phthalic acid compound in a molar amount as much as 1.8-2.2 times a molar amount corresponding to a difference between the molar amount of the aromatic diamine compound and the molar amount of the biphenyltetracarboxylic acid compound dissolved in ethanol, in which a total amount of the biphenyltetracarboxylic acid compound, 4-(2-phenylethynyl)phthalic acid compound and aromatic diamine compound is in the range of 30 to 80 wt. % based on an amount of the thermosetting solution composition, which comprises the steps of:

placing a biphenyltetracarboxylic acid compound containing at least 15 molar % of 2,3,3',4'-biphenyltetracarboxylic dianhydride and/or 2,2',3,3'-biphenyltetracarboxylic dianhydride, and 4-(2-phenylethynyl)phthalic anhydride in methanol, to give a suspension;

heating the suspension to give a methanol solution in which the partial methyl ester of the biphenyltetracarboxylic acid compound and the partial methyl ester of 4-(2-phenylethynyl)phthalic acid are dissolved;

mixing the aromatic diamine compound with the solution obtained above, whereby giving a thermosetting methanol solution in which the partial methyl ester of the biphenyltetracarboxylic acid compound, the partial methyl ester of 4-(2-phenylethynyl)phthalic acid and the aromatic diamine compound are dissolved;

drying the thermosetting methanol solution, whereby giving a thermosetting powdery composition; and dissolving the thermosetting powdery composition in ethanol, whereby giving a thermosetting solution composition.

8. The process of claim 7, in which the aromatic diamine compound is p-phenylenediamine, 1,3-bis(4-aminophenoxy)benzene or a mixture thereof.

9. The process of claim 7, in which the aromatic diamine compound comprises a mixture of p-phenylenediamine and 1,3-bis(4-aminophenoxy)benzene wherein p-phenylenediamine is present in an amount of 50 to 70 molar %.

* * * * *